US011185157B2

(12) United States Patent
Bayr

(10) Patent No.: US 11,185,157 B2
(45) Date of Patent: Nov. 30, 2021

(54) COMPUTER FURNITURE

(71) Applicant: Markus Bayr, Vienna (AT)

(72) Inventor: Markus Bayr, Vienna (AT)

(*) Notice: Subject to any disclaimer, the term of this patent is extended or adjusted under 35 U.S.C. 154(b) by 0 days.

(21) Appl. No.: 16/646,566

(22) PCT Filed: Sep. 10, 2018

(86) PCT No.: PCT/EP2018/074301
§ 371 (c)(1),
(2) Date: Mar. 11, 2020

(87) PCT Pub. No.: WO2019/052942
PCT Pub. Date: Mar. 21, 2019

(65) Prior Publication Data
US 2020/0260864 A1    Aug. 20, 2020

(30) Foreign Application Priority Data

Sep. 12, 2017  (AT) .......................... GM50169/2017

(51) Int. Cl.
*A47B 21/04*    (2006.01)
*A47B 9/16*    (2006.01)
*A47B 21/02*    (2006.01)

(52) U.S. Cl.
CPC ................ *A47B 21/04* (2013.01); *A47B 9/16* (2013.01); *A47B 21/02* (2013.01)

(58) Field of Classification Search
CPC .......... A47B 21/04; A47B 21/02; A47B 9/16; A47B 3/002; A47B 13/02; A47B 2021/066; A47B 49/008; A47B 2200/0056

USPC ....... 108/6, 50.01, 50.02, 59, 92, 93, 95, 96, 108/106, 145, 147.19, 147.2, 49, 20; 248/188.1, 188.6; 312/223.3
See application file for complete search history.

(56) References Cited

U.S. PATENT DOCUMENTS

| 289,384   | A | * | 12/1883 | Byrkit |
| 689,758   | A | * | 12/1901 | Shaw |
| 1,862,237 | A | * | 6/1932  | Pepler ............... A47B 23/02 |
|           |   |   |         | 108/49 |

(Continued)

FOREIGN PATENT DOCUMENTS

| WO | WO03/063647 A2  | 8/2003 |
| WO | WO2009/138824 A1 | 11/2009 |

OTHER PUBLICATIONS

Search Report and Written Opinion dated Nov. 19, 2018 of international application No. PCT/EP2018/074301.

*Primary Examiner* — Janet M Wilkens
(74) *Attorney, Agent, or Firm* — Gordon & Jacobson, P.C.

(57) ABSTRACT

A piece of computer furniture for adjustably positioning at least one computer peripheral device, with a base (1) arranged below a legroom (2) and adapted to support the piece of computer furniture on the floor, a shelf (3) for placing or holding the piece of computer peripheral device, a main stand (4) extending from the base (1) on one side and laterally adjacent the legroom (2) to the shelf (3). The main stand (4) is connected or coupled to the base (1) via a first joint (5) so as to be inclinable and fixable in a selectable inclination position. The shelf (3) is connected or coupled to the main stand (4) via a second joint (6) so as to be inclinable and fixable in a selectable inclination position. A swivel joint (7) is provided for horizontally pivoting the shelf (3).

19 Claims, 3 Drawing Sheets

(56) References Cited

U.S. PATENT DOCUMENTS

| | | | |
|---|---|---|---|
| 6,470,809 B1* | 10/2002 | Herbert | B60R 11/04 |
| | | | 108/42 |
| 2007/0145219 A1 | 6/2007 | Lin | |
| 2007/0164176 A1 | 7/2007 | Liao | |
| 2018/0346046 A1* | 12/2018 | Noh | B62D 65/18 |
| 2019/0357671 A1* | 11/2019 | Duerstock | A47B 9/16 |

* cited by examiner

COMPUTER FURNITURE

CROSS-REFERENCE TO RELATED APPLICATION(S)

This application is the National Stage of International Patent Application No. PCT/EP2018/074301 filed on Sep. 10, 2018, which claims priority from Austrian Patent Application No. GM50169/2017 filed on Sep. 12, 2017, both of which are herein incorporated by reference herein in their entireties.

BACKGROUND

The invention relates to a piece of computer furniture.

Computer furniture, in particular computer furniture configured to hold peripheral devices for computer games, are known and published in various embodiments. This mostly specialized computer furniture is designed for a certain type and arrangement of peripheral devices. For example, for car racing simulators there are special holders to form racing simulators, which are designed to hold a steering wheel and operating pedals. For other computer games, for example, which are operated exclusively via a keyboard and a computer mouse, also conventional tables can be used.

However, the market now demands computer furniture that can be flexibly adapted to different configurations. For example, there is a demand for computer furniture that can be operated both from a sofa and a chair. A simple changeover of different peripheral devices should also be easily possible.

For these different configurations, however, it is necessary that the piece of computer furniture can be flexibly adapted to the respective configuration. Conventional adjustable tables usually do not have the necessary degrees of freedom for optimal use as computer furniture. Furthermore, such adjustable tables are often not suitable for absorbing the high forces generated during computer gaming. For example, relatively high forces and moments occur when operating a steering wheel as a computer input device.

SUMMARY

The object of the invention is to overcome the disadvantages of the state of the art and in particular to create a piece of computer furniture which can be flexibly adapted to different configurations.

The object according to the invention is solved in particular by the features hereinafter disclosed.

In particular, the invention relates to a piece of computer furniture for adjustably positioning at least one computer peripheral device, such as in particular a keyboard, a computer mouse, a foot pedal, a joystick, a steering wheel and/or a screen, comprising a base arranged below a legroom and adapted to support the piece of computer furniture on the floor, a shelf for placing or holding the computer peripheral device, a main stand extending from the base on one side and laterally adjacent the legroom to the shelf, wherein the main stand is connected or coupled to the base via a first joint so as to be inclinable and fixable in a selectable inclination position, wherein the shelf is connected or coupled to the main stand via a second joint so as to be inclinable and fixable in a selectable inclination position, and wherein a swivel joint is provided for pivoting the shelf horizontally.

Optionally, it is provided that the first joint has an essentially horizontally extending first swivel axis for changing the inclination of the main stand relative to the base, and that the second joint has an essentially horizontally extending second swivel axis for changing the inclination of the shelf relative to the main stand.

Optionally, it is provided that the first swivel axis and the second swivel axis run essentially parallel to one another and in particular parallel to the terminal edge of the shelf which faces the user of the piece of computer furniture when the computer peripheral device is operated as intended.

Optionally, it is provided that the swivel bearing is provided between the shelf and the second joint so that the shelf can be pivoted in its inclined position determined by the inclination of the first and second joints.

Optionally, it is provided that the main stand is designed to be variable in length.

Optionally, it is provided that the piece of computer furniture is designed to be self-standing, and in particular that the shelf is supported exclusively by the main stand and protrudes freely on one side.

Optionally, it is provided that the base, the main stand and the shelf are arranged in a C-shape in their operating position.

Optionally, it is provided that the legroom is limited or restricted in the horizontal direction only by the main stand.

The piece of computer furniture is preferably suitable for embracing a piece of seating furniture laterally and/or from the front.

Thus, the piece of computer furniture has a legroom, which, in a preferred operating position, is limited from above by the shelf, from below by the base and on one side by the main stand. This arrangement of the shelf, the main stand and the base thus corresponds to a C-shape. This C-shape makes it possible, for example, to place the piece of computer furniture laterally in the area of a piece of seating furniture in such a way that the base is arranged below the seating furniture and the shelf is arranged at a distance above the piece of seating furniture. The main stand, for example, runs laterally next to the piece of seating furniture. The shelf protrudes laterally from the main stand, allowing a person sitting on the piece of seating furniture to operate the computer peripheral devices on the shelf. Thus, this configuration has a C-shape in a vertically extending plane that is transverse to the seating direction of the operator and parallel to an image display surface, for example.

In addition or as an alternative, in a preferred operating position, the piece of computer furniture also has a C-shape in a second plane. Thus, the shelf extends towards the operator. The base also extends from the main stand towards the operator. This makes it possible, for example, to slide the base under a piece of seating furniture from the front. It is also possible to place the shelf above the piece of seating furniture, in particular at a distance from the sofa. This allows an operator to sit on the piece of seating furniture to operate the computer peripheral devices located on the shelf. This gives the piece of computer furniture a C-shape in a vertical plane, which runs along the seating direction and, for example, along the direction of the operator's line of sight.

In a preferred embodiment and operating position of the piece of computer furniture, it is thus possible for it to embrace a piece of seating furniture laterally and/or from the front. In this way, the shelf can be arranged in a self-supporting manner above different pieces of seating furniture, such as above a sofa, a chair or a bed.

In all exemplary set-up possibilities there is a demand for the person to be able to leave the seat easily and without major alterations. In this respect, the piece of computer furniture in particular offers a further degree of freedom.

This degree of freedom makes it possible to pivot the shelf horizontally. This allows the person to swivel the shelf away and stand up without having to change the position of the base or the placement of the computer peripheral device on the shelf, for example. The pivotal movement of the shelf is preferably done via a swivel joint. This swivel joint preferably comprises a vertically extending swivel axis. In particular, the design of the swivel joint makes it possible to pivot the shelf horizontally in its previously defined position. Any objects placed on the shelf can thus remain on the shelf during the pivotal movement.

Optionally, it is provided that at least one auxiliary stand is provided at the protruding end of the shelf. Preferably, this auxiliary stand is designed to be foldable or removable. It serves as an optional, additional support for the shelf at its protruding end. However, the piece of computer furniture is basically designed in such a way that the shelf can also be held by the main stand alone.

Optionally, at least one auxiliary stand is provided attached to the main stand, configured for optional, additional support of the main stand on the floor.

Optionally, it is provided that the first joint and/or the second joint each comprise two parts which can be pivoted relative to each other and which can be rigidly connected to each other by means of an actuation member in order to be able to select and fix a desired rotational position. Optionally, these two parts comprise a toothing or other positive-locking elements so that the stability of the fixing can be improved. In particular, the two parts of a joint may act in a similar way to a claw coupling, which in its fixed position has elements in positive active contact with each other. In their open position, the two parts can be moved apart from each other along the axis of rotation in such a way that the positive connection is separated and in particular the elements are moved away from each other so that a pivotal movement of the joint and the two parts of the joint is possible. Preferably, the positive locking elements are tapered or wedge-shaped towards their protruding ends, so that operability is improved.

The swivel joint comprises, for example, an axis or shaft following the swivel axis. This can, for example, be rigidly connected to the main stand, to the second joint or to the shelf. Furthermore, this swivel joint may include two rotary bearings that can rotate about this shaft or axis. In order to allow the moments caused by the protruding design of the shelf to be absorbed, these two bearings may be spaced apart along the course of the swivel axis. Preferably, it is provided that the rotation of these rotary bearings relative to the axis or shaft, in particular the degree of freedom of the swivel joint and the ability for pivotal movement of the shelf, can be blocked via an actuation member. This can be achieved, for example, by clamping or positive fixing of the joint.

Preferably, it is provided that the base is designed as a plate or beam which extends from the area where the main stand is attached to the base towards the operator and thus against the seating direction. In addition or as an alternative, it is preferably provided that the base extends from the area where the main stand is attached to it, laterally under the legroom, i.e. transversely to the seating direction. Preferably, it is provided that the shelf is located above the base in a preferred operating position. In particular, the base and the shelf are positioned relative to each other in such a way that the centre of gravity of the piece of computer furniture is located within the contact area of the base, so that the forces introduced via the shelf are guided into the floor via the base.

Preferably, the entire piece of computer furniture is self-supporting or self-standing in all embodiments. In particular, the piece of computer furniture is designed to be self-supporting or self-standing in all its possible operating positions.

The invention will be described in more detail below by means of an exemplary, not limiting embodiment.

DETAILED DESCRIPTION

Figure 1:
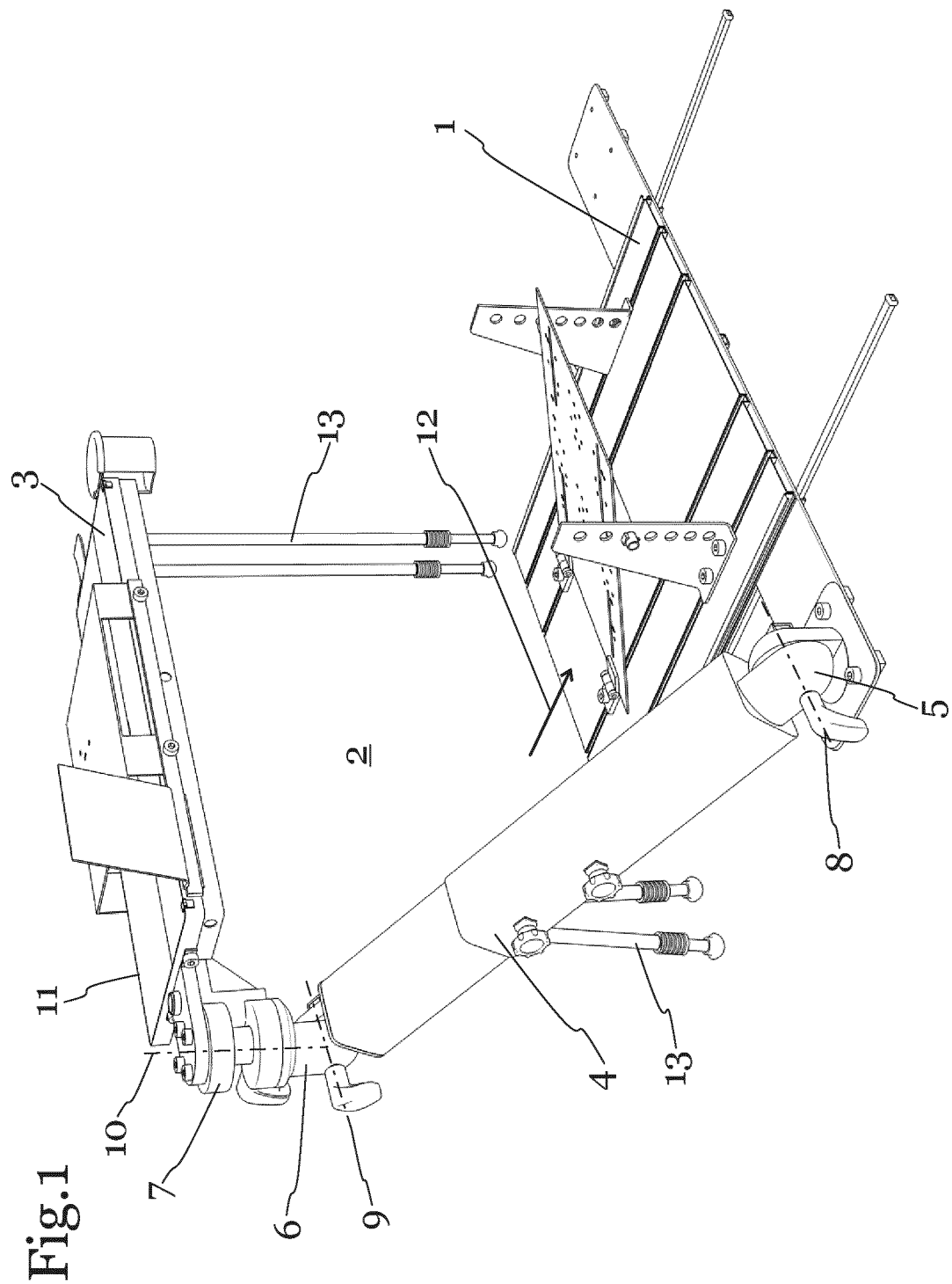
FIG. 1 shows a first view of the piece of computer furniture in its preferred operating position.

Unless otherwise stated, the reference signs in the figures correspond to the following components:

Base 1, legroom 2, shelf 3, main stand 4, first joint 5, second joint 6, swivel joint 7, first swivel axis 8, second swivel axis 9, swivel axis (of the swivel joint) 10, terminal edge 11, seating direction 12, auxiliary stand 13, drive system 14, first linear drive 15, second linear drive 16, third linear drive 17.

FIG. 1 shows a perspective view of a first embodiment of a piece of computer furniture according to the invention. The piece of computer furniture comprises a base 1, a shelf 3 and a main stand 4, by which the shelf 3 is connected or coupled to the base 1. A legroom 2 is provided between the base 1 and the shelf 3 for receiving the legs of the operator in a preferred operating position of the piece of computer furniture. The base 1 is designed to stand on the floor or at least to support the piece of computer furniture on the floor, wherein the base 1 optionally comprises adjustment stands or support stands. The main stand 4 is designed to be inclinable and in particular to be inclinable relative to the floor. For this purpose, a first joint 5 is provided which enables the main stand 4 to be pivoted, in particular inclined, relative to the base 1 about a first swivel axis 8. The first joint 5 is designed in particular in such a way that the main stand 4 can be fixed in a desired inclined position.

The piece of computer furniture further comprises a second joint 6. This second joint 6 is configured to enable the shelf 3 to be pivoted relative to the main stand 4 about a second swivel axis 9. This allows the inclination of the shelf 3 relative to the main stand 4, but also in particular relative to the base 1 and the floor, to be selected and fixed. The piece of computer furniture further comprises a swivel joint 7. This swivel joint 7 allows the shelf 3 to be swivelled about a swivel axis 10. In the present embodiment, this swivel axis 10 runs essentially vertically, allowing the shelf 3 to be pivoted essentially horizontally by means of the swivel joint 7. In the present embodiment, the two swivel axes 8, 9 run essentially horizontally, so that the inclination of the shelf 3 and the main stand 4, respectively, relative to the base 1 or the floor can be selected. In particular, the provision of the two joints 5, 6 makes it possible to keep the shelf 3 at a certain angle, especially horizontally, despite a change in the inclination of the main stand 4 relative to the base 1 or the floor. In a preferred way, the first swivel axis 8 and the second swivel axis 9 are parallel to each other.

Preferably, all the joints 5, 6, 7, in particular the first joint 5, the second joint 6 and the swivel joint 7, are can be secured so that their degree of freedom can be blocked. When the joints 5, 6, 7 are secured, a rigid support of the shelf 3 is formed, the distribution of forces of which, starting from the shelf 3, is directed into the ground via the swivel joint 7, further via the second joint 6, further via the main stand 4, the first joint 5 and via the base 1.

The shelf 3 protrudes freely, starting from the main stand 4. At the free end or in the area of the free end at least one auxiliary stand 13 may optionally be provided. This auxiliary stand 13 is preferably designed to be foldable or removable and is intended in particular to support the free end of the shelf 3. A similar removable or foldable auxiliary stand 13 may also be provided for additional support of the main stand 4. In the present embodiment, the main stand 4 is inclined towards the operator, i.e. against the seating direction 12. The terminal edge 11 of the shelf 3, which faces the operator, thus projects towards the operator, starting from the base 1. The base 1 itself extends towards the operator close to the floor. In particular, the base 1 extends from the area where the main stand 4 is attached against the seating direction 12 towards the operator. This forms a substantially C-shaped structure in which the base 1 can be pushed underneath a piece of seating furniture and the shelf 3 is arranged above the piece of seating furniture.

In addition, a further C-shape is provided in the present embodiment given that the main stand 4 is arranged laterally, and in particular laterally of the legroom 2. The base 1 and the shelf 3 extend from the main stand 4 above and below the legroom 2 in the same direction. This C-shape allows the piece of computer furniture to laterally embrace a piece of seating furniture. The auxiliary stands 13, if provided, could be folded away in this position in which a piece of seating furniture is embraced.

Furthermore, the main stand 4 can be adjusted which allows the length of the main stand 4 to be adjusted. For example, the main stand 4 can be of telescopic design, whereby the two parts of the main stand 4 which can be extended telescopically relative to each other can be rigidly connected to each other by means of a connecting means so that the length can be selected and fixed.

Preferably, special holders, for example for a beverage container, a keyboard, a computer mouse or for other devices, are provided on the shelf 3.

Optionally, special attachments, for example for pedals, are provided at the base 1.

Figure 2:
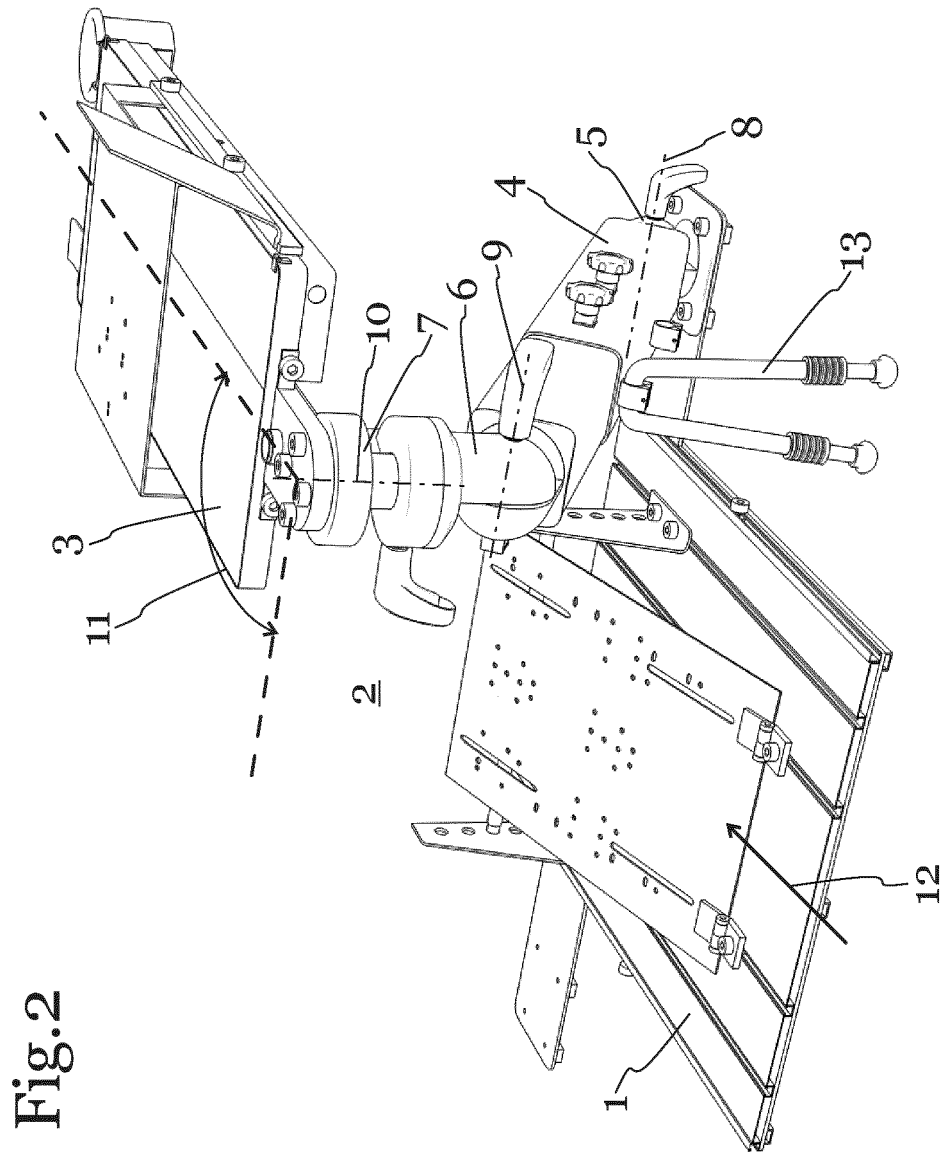
FIG. 2 shows the same piece of computer furniture as FIG. 1, but with a pivoted shelf.

FIG. 2 shows the same piece of computer furniture as FIG. 1, with the piece of computer furniture in FIG. 2 in a position in which the shelf 3 is swivelled away from the operator by about 90° compared to the position in FIG. 1. This pivot movement is made possible by the swivel joint 7. In this position, the shelf 3 is arranged above the main stand 4 and the legroom 2 is opened upwards.

According to another possible position of the piece of computer furniture, the main stand 4 can be arranged essentially vertically, so that the shelf 3 is arranged above the base 1, and the piece of computer furniture is designed as a standing desk or lectern, for example. In this position, too, the centre of gravity of the piece of computer furniture is preferably located in the area of base 1. Any structures for foot pedals can be removed in this position or their position can be changed in such a way that the person can stand on a part of base 1. In particular, the base 1 can be flat or plate-shaped for this embodiment. Simply by pivoting the main stand 4 from an inclined position to an upright position, the shelf 3 is moved to a higher position. The height of the shelf 3 can be further adjusted by adjusting the length of the main stand 4. In particular, it can be adapted to the size of the person.

According to another, not shown, embodiment, the base 1 can comprise a linkage for supporting the base 1 laterally and for increasing the contact surface. In particular, one or more rods may be provided which project extendably from the base 1 to enlarge the standing surface.

Figure 3:
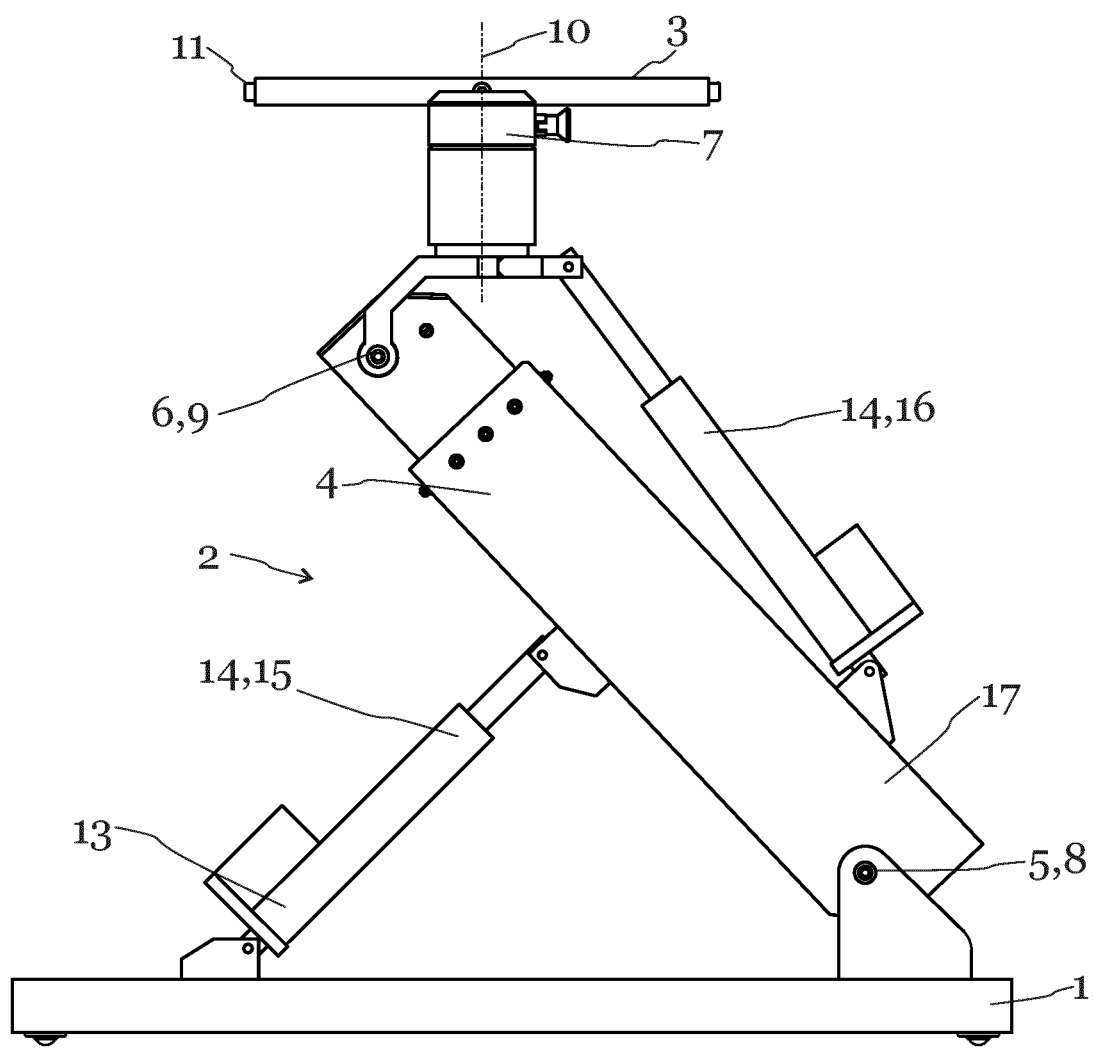
FIG. 3 shows another embodiment of a piece of computer furniture.

FIG. 3 shows a further embodiment of the piece of computer furniture, the components provided with reference signs corresponding to or being substantially equivalent in effect to the components of FIGS. 1 and 2.

In addition to the components already described in FIGS. 1 and 2, the embodiment of FIG. 3 comprises a drive system 14 configured to move the movable components of the piece of computer furniture. Thus, the shelf 3 is arranged to be movable relative to the ground and in particular relative to the operator by means of several swivel joints 5, 6, 7 and can be locked in a desired position. By means of the drive system 14, this adjustment and fixing can be carried out by external force and in particular automatically or in an automated manner. The drive system 14 may, for example, comprise drives, such as rotary drives or linear drives, by which a drive can be effected along the given degrees of freedom or about the given degrees of freedom.

In the present embodiment, a first linear drive 15 is provided. This first linear drive 15 is attached to the base 1 on the one hand and to the main stand 4 on the other. With the present configuration, the first linear drive 15 can be used to pivot the main stand 4 relative to the base 1 about the first joint 5.

Furthermore, the following embodiment also comprises a second linear drive 16. This second linear drive 16 is attached to the main stand 4 on one side. On its other side, the second linear drive 16—remote from the second joint 6—is attached to an element that allows the shelf 3 and, in the present configuration, also the swivel joint 7 to be pivoted.

In the present embodiment, a third linear drive 17 is also provided, which, for example, is arranged within the main stand 4 and can cause a length adjustment of the main stand 4.

The drive system 14, and in particular the three linear drives 15, 16 and 17, thus enables a pivotal movement about the first joint 5 and about the second joint 6 as well as length adjustment of the main stand 4.

Preferably, the drive system 14 comprises a control device which is designed, for example, in such a way that the shelf 3 is held in a predefined position, in particular horizontally, when the components of the piece of computer furniture are adjusted. This control can be designed according to the state of the art.

The linear drives 15, 16, 17 can, for example, be designed as threaded rod drives, ball screw drives or roller screw drives.

The drive system 14 and in particular its linear drives 15, 16, 17 can be regarded as part of the main stand 4.

The invention claimed is:

1. A piece of computer furniture for adjustably positioning at least one computer peripheral device, comprising:
 a base arranged below a legroom and configured to support the piece of computer furniture on a floor,
 a shelf for placing or holding the computer peripheral device, and
 a main stand extending from the base on one side and laterally adjacent the legroom to the shelf;
 wherein the main stand is connected or coupled to the base via a first joint so as to be inclinable and fixable in a selectable inclination position;
 wherein the shelf is connected or coupled to the main stand via a second joint so as to be inclinable and fixable in a selectable inclination position;

wherein a swivel joint is provided for horizontally pivoting the shelf; and wherein the swivel joint is provided between the shelf and the second joint.

2. The piece of computer furniture according to claim 1, wherein;

the first joint has a substantially horizontally extending first swivel axis for changing the inclination of the main stand relative to the base; and the second joint has a substantially horizontally extending second swivel axis for changing the inclination of the shelf relative to the main stand.

3. The piece of computer furniture according to claim 2, wherein the first swivel axis and the second swivel axis run essentially parallel to one another.

4. The piece of computer furniture according to claim 3, wherein the main stand is variable in length.

5. The piece of computer furniture according to claim 3, wherein the computer furniture is self-standing.

6. The piece of computer furniture according to claim 3, wherein the base, the main stand and the shelf are arranged in a C-shape in their operating position.

7. The piece of computer furniture according to claim 3, wherein the shelf is supported exclusively by the main stand and protrudes freely on one side.

8. The piece of computer furniture according to claim 2, wherein the main stand is variable in length.

9. The piece of computer furniture according to claim 2, wherein the computer furniture is self-standing.

10. The piece of computer furniture according to claim 2, wherein the base, the main stand and the shelf are arranged in a C-shape in their operating position.

11. The piece of computer furniture according to claim 2, wherein the shelf is supported exclusively by the main stand and protrudes freely on one side.

12. The piece of computer furniture according to claim 1, wherein the main stand is variable in length.

13. The piece of computer furniture according to claim 12, further comprising a drive system configured to drive the main stand and the shelf.

14. The piece of computer furniture according to claim 1, wherein the computer furniture is self-standing.

15. The piece of computer furniture according to claim 1, wherein the base, the main stand and the shelf are arranged in a C-shape in their operating position.

16. The piece of computer furniture according to claim 1, wherein the legroom is limited in the horizontal direction only by the main stand.

17. The piece of computer furniture according to claim 1, wherein the computer peripheral device comprises at least one of a keyboard, a computer mouse, a foot pedal, a joystick, a steering wheel, or a screen.

18. The piece of computer furniture according to claim 1, wherein the shelf is supported exclusively by the main stand and protrudes freely on one side.

19. A piece of computer furniture for adjustably positioning at least one computer peripheral device, comprising:

a base arranged below a legroom and configured to support the piece of computer furniture on a floor, a shelf for placing or holding the computer peripheral device, a main stand extending from the base on one side and laterally adjacent the legroom to the shelf, and a drive system configured to drive the main stand and the shelf;

wherein the main stand is connected or coupled to the base via a first joint so as to be inclinable and fixable in a selectable inclination position;

wherein the shelf is connected or coupled to the main stand via a second joint so as to be inclinable and fixable in a selectable inclination position; and wherein a swivel joint is provided for horizontally pivoting the shelf.

* * * * *